(12) United States Patent
Brookner

(10) Patent No.: US 6,227,445 B1
(45) Date of Patent: *May 8, 2001

(54) SECURE SMART CARD ACCESS TO PRE-PAID METERING FUNDS IN METER

(75) Inventor: George Brookner, Norwalk, CT (US)

(73) Assignee: Ascom Hasler Mailing Systems, Inc., Shelton, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,549

(22) PCT Filed: Apr. 23, 1997

(86) PCT No.: PCT/US97/06703

§ 371 Date: Mar. 23, 1998

§ 102(e) Date: Mar. 23, 1998

(87) PCT Pub. No.: WO97/40602

PCT Pub. Date: Oct. 30, 1997

Related U.S. Application Data

(60) Provisional application No. 60/016,083, filed on Apr. 23, 1996.

(51) Int. Cl.[7] .................................................... G06F 17/60
(52) U.S. Cl. .......................... 235/379; 235/375; 705/60; 705/410
(58) Field of Search .................................. 235/101, 375, 235/379, 381, 432; 705/401, 402, 403, 405, 410, 60, 61

(56) References Cited

U.S. PATENT DOCUMENTS

| | | | |
|---|---|---|---|
| 4,757,532 | * | 7/1988 | Gilham ................................. 705/61 |
| 4,780,601 | * | 10/1988 | Vermesse ............................ 235/375 |
| 4,802,218 | * | 1/1989 | Wright et al. ......................... 705/60 |
| 4,901,241 | | 2/1990 | Schneck .......................... 364/464.02 |
| 4,908,499 | | 3/1990 | Guion .................................. 235/380 |
| 4,978,839 | * | 12/1990 | Chen et al. ......................... 235/375 |
| 5,111,030 | * | 5/1992 | Brasington et al. ................. 235/375 |
| 5,844,220 | * | 12/1998 | Eddy et al. .......................... 235/381 |
| 5,884,292 | * | 3/1999 | Baker et al. ........................ 705/403 |
| 6,111,951 | * | 8/2000 | Guenther ............................. 235/375 |

FOREIGN PATENT DOCUMENTS

| | | | |
|---|---|---|---|
| 0 911 767 A2 | * | 4/1999 | (EP) . |
| 2 132 138 | * | 7/1984 | (GB) . |

* cited by examiner

*Primary Examiner*—Karl D. Frech
*Assistant Examiner*—Jared J. Fureman
(74) *Attorney, Agent, or Firm*—James F. McLaughlin; Perman & Green, LLP

(57) ABSTRACT

The system has a postal security device that contains stored postage value, which causes the nonsecure printer to print onto a mail piece. In addition, the postal security device is attached to a secure card interface, which receives a secure card. The postal security device is connected to the TMS host by a data link. The TMS host is connected to the postal authority by a data link.

11 Claims, 4 Drawing Sheets

SECURE SMART CARD ACCESS TO PRE-PAID METERING FUNDS IN METER

This application is a 371 of PCT/US97/06703 filed Apr. 23, 1997 which claims benefit of provisional No. 60/016,083 filed Apr. 23, 1996.

TECHNICAL FIELD

The invention relates generally to postage meters (franking machines) in connection with secure chip cards (e.g. smart cards) containing encoded information indicative of stored value, and relates more particularly to making stored value in a postage meter available to the holder of a card containing such encoded information.

BACKGROUND ART

Postage machines are well known and in common use. A classic postage meter is composed of a memory representing stored postage value, and a printing mechanism for printing postage indicia on mail pieces, all in a secure housing. It has also been proposed to use what is termed a "postal security device" or PSD, connected via a nonsecure communications channel with a nonsecure printer, as a substitute for a classic postage meter. The PSD has a secure housing, and encrypted information is communicated from the PSD to the printer for printing as part of the postage indicia. It has also been proposed to use a PSD connected via nonsecure communications channels such as local-area networks, to a plurality of printers for printing of such indicia.

With any of these arrangements the postage meter or PSD (referred to collectively herein as postage metering devices) contains accounting registers. The accounting registers may be pure mechanical registers in a pure mechanical postage meter, in which the postage value is stored by physical positions of gears and shafts. The registers may be nonvolatile semiconductor memories in the case of an electronic postage meter or a PSD. In any of these arrangements, the practical situation is that there is stored value in the metering device, and that stored value can be put to use only by the printing of postage value on mail pieces, or in the exteme case by taking the metering device out of service and requesting a refund from the postal authority.

DISCLOSURE OF INVENTION

In accordance with the invention, a customer's prepaid postage metering funds are made available to the customer's secure stored-value chip (e.g. SMART) card in addition to being available through a postage meter for printing of postage. Cryptographic exchanges take place between the metering device and the stored-value card to effect a transfer of stored value.

BRIEF DESCRIPTION OF DRAWING

The invention will be described with respect to a drawing in several figures, of which.

MODES FOR CARRYING OUT INVENTION

Figure 1:
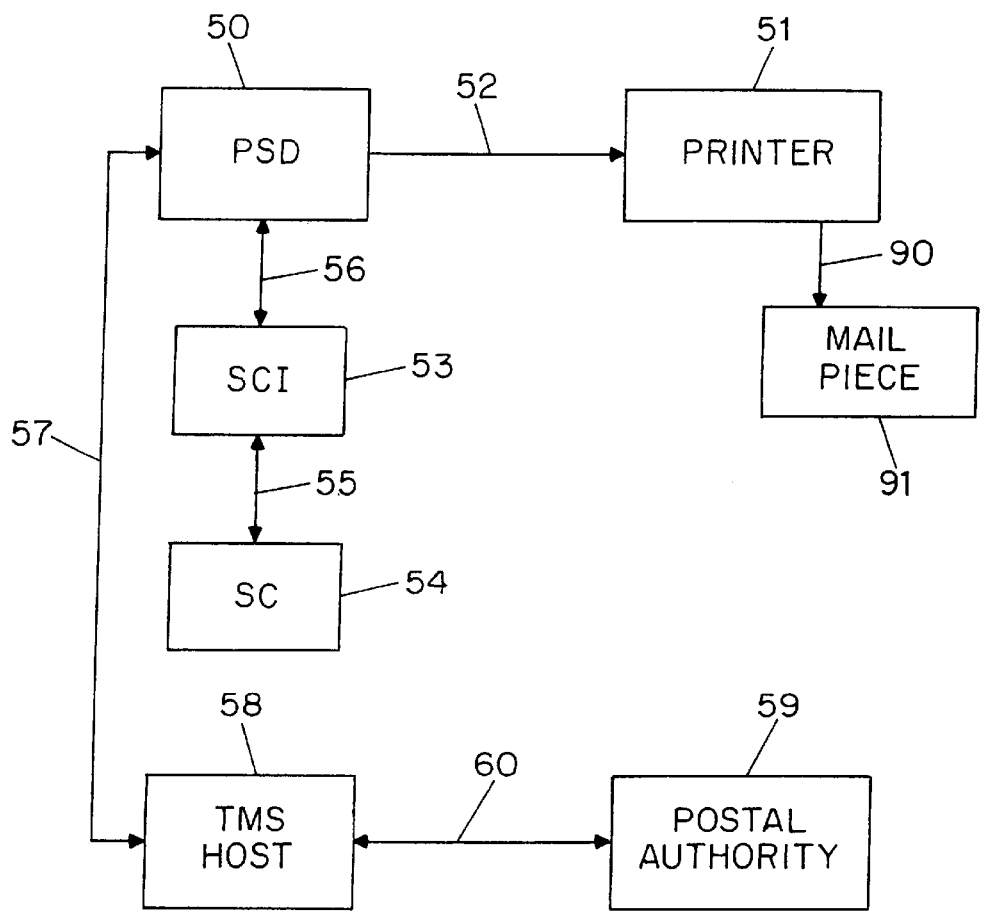
FIG. 1 is a functional block diagram of a system in accordance with the invention in which a postal security device is employed.

Turning first to FIG. 1, what is shown is a functional block diagram of a system in accordance with the invention in which a postal security device 50 is employed. The PSD 50 contains stored postage value. When used for the printing of postage indicia, the PSD 50 provides information via nonsecure channel 52 to a nonsecure printer 51, and the information makes possible the printing of a postage indicium on the mail piece 91. Eventually the stored value in the PSD 50 is exhausted and no more postage indicia may be printed, due to the programming of the PSD 50. At that time, if not before, it is necessary to "refill" the PSD 50 by means of a telemeter setting (TMS) session. In a TMS session, a nonsecure data link 57 is established between the PSD 50 and a TMS host 58, operated by the manufacturer of the PSD 50 or an appropriate third party. The data link 57 may be a modem-to-modem telephone connection, or an ISDN connection, or a TCP/IP connection, for example. Prior to the TMS session, the user of the PSD 50 will have arranged to have funds on deposit with the manufacturer or with the postal authority 59. In the TMS session, encrypted data are exchanged-so that postage value is transferred from the TMS host 58 to the PSD 50. In practical terms, the funds on deposit with the manufacturer or postal authority are decreased, and the stored value in the PSD is increased. Telemeter setting (TMS) may be carried-out as set forth in EPO pub. no. EP 442761, or as set forth in PCT pub. no. WO 86-05611, each of which is incorporated herein by reference.

As will be discussed in more detail below, in the system in accordance with the invention, a smart card interface, PC card interface, or the like 53 is connected via a nonsecure communications channel 56 with the PSD 50. (Alternatively the PSD 50 and the SCI 53 may be placed within a secure housing, in which case the channel 56 is secure.) A smart card, PC card, or the like 54 may then be plugged into the SCI 53, thereby placing the smart card 54 into communication with the PSD 50. As discussed below, it is then possible to transfer stored value from the PSD 50 to the card 54.

Figure 2:
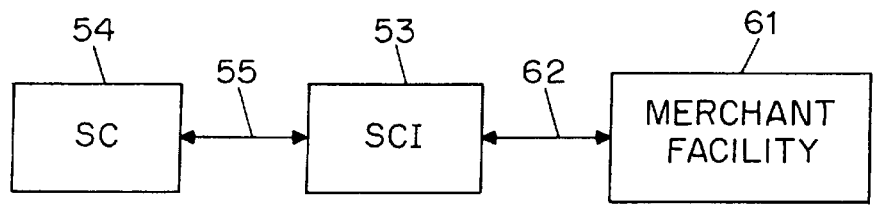
FIG. 2 is a functional block diagram of a prior art system in which a stored-value card is used to transfer funds to a merchant.

FIG. 2 is a functional block diagram of a prior art system in which a stored-value card is used to transfer funds to a merchant. This is indeed one of the defining capabilities of a stored-value smart card of the type discussed herein. A user desiring to purchase goods or services from a merchant facility 61 may pay cash, or may pay by credit card, or may use the stored-value smart card 54 in connection with smart card interface 53 to transfer stored value to the merchant facility 61 in a manner that is well known to those skilled in the art.

Figure 3:
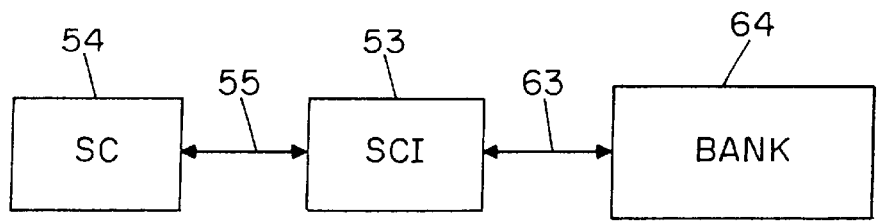
FIG. 3 is a functional block diagram of a prior art system in which a stored-value card receives value from a bank.

FIG. 3 is a functional block diagram of a prior art system in which a stored-value card receives value from a bank. This, too, is one of the defining capabilities of a stored-value smart card of the type discussed herein. A user desiring to add to the stored value of the card will, in prior art systems, go to a bank or other financial institution 64 to arrange for the placement of stored value in the card 54.

Figure 4:
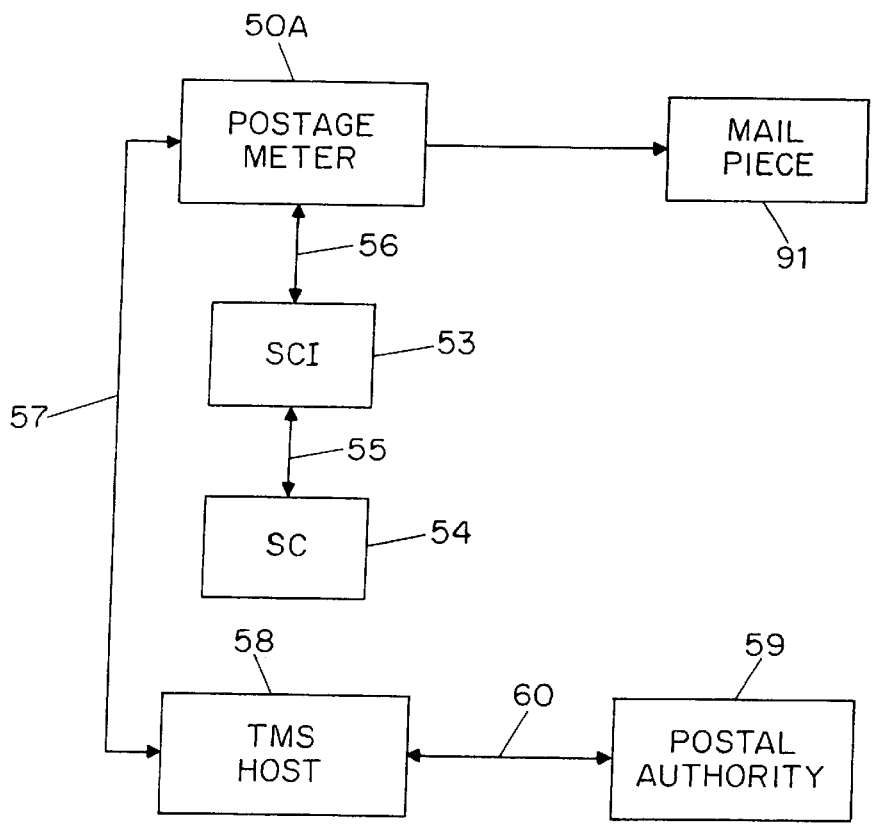
FIG. 4 is a functional block diagram of a system in accordance with the invention in which a postage meter is employed.

FIG. 4 is a functional block diagram of a system in accordance with the invention in which a postage meter is employed, functioning in a fashion that is analogous to the system of FIG. 1. The postage meter 50A contains stored postage value. When used for the printing of postage indicia, the PSD 50 prints indicia directly on the mail piece 91. Eventually the stored value in the postage meter 50A is exhausted and no more postage indicia may be printed, due to the programming of the postage meter 50A. At that time, if not before, it is necessary to "refill" the postage meter 50A by means of a telemeter setting (TMS) session. In a TMS session, a nonsecure data link 57 is established between the postage meter 50A and a TMS host 58, operated by the manufacturer of the postage meter 50A or by an appropriate third party. The data link 57 may be a modem-to-modem telephone connection, or an ISDN connection, or a TCP/IP connection, for example. Prior to the TMS session, the user of the postage meter 50A will have arranged to have funds on deposit with the manufacturer or with the postal authority 59. In the TMS session, encrypted data are exchanged so that postage value is transferred from the TMS host 58 to the postage meter 50A. In practical terms, the funds on deposit with the manufacturer or postal authority are decreased, and the stored value in the meter is increased.

In this embodiment, stored value in the postage meter 50A may be transferred to a stored-value smart card 54 via smart-card interface 53, in the same way as was described above in connection with FIG. 1.

The term "metering device" will be employed to encompass the several devices for storing postage value, including postage meters (franking machines) and postal security devices.

Figure 5:
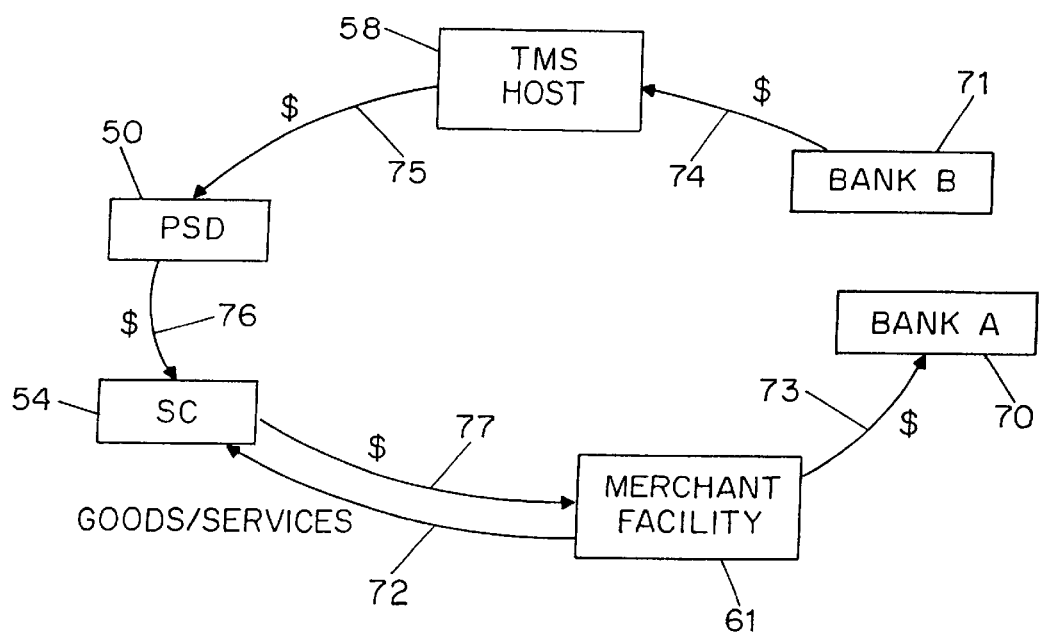
FIG. 5 is a flow diagram showing the passage of money and/or stored value among devices.

FIG. 5 is a flow diagram showing the passage of money and/or stored value among devices. The user of a postage device such as PSD 50 (or postage meter) places money on deposit with bank B 71 or other entity designated by the postal authority. This deposit is communicated to the TMS host 58 and thus enables the TMS host 58 to engage in a TMS session with the PSD 50 to transfer stored value into the PSD 50. In accordance with the invention, in transfer 76 some or all of the stored value of the PSD 50 is transferred to stored-value smart card 54. Then, the user of the smart card 54 obtains goods or services from merchant facility 61 (arrow 72) and in exchange, stored value is transferred to the merchant facility (arrow 77). A further exchange (arrow 73) permits the merchant facility 61 to obtain bank funds on deposit in bank A 70.

Figure 6:
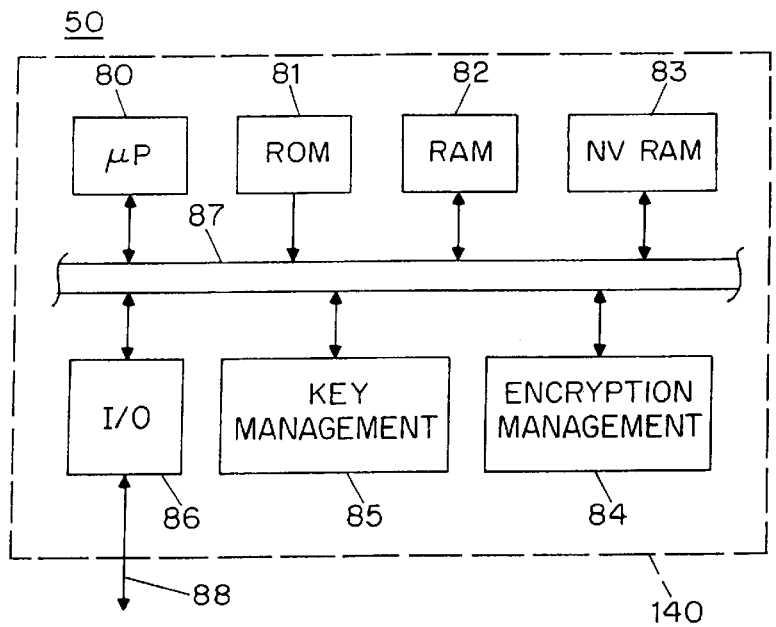
FIG. 6 is a functional block diagram of a typical postage security device of a type used in connection with the invention.

FIG. 6 is a functional block diagram of a typical postage security device 50 of a type used in connection with the invention. The PSD 50 has a secure housing 140, within which is a data bus 87 supporting a processor 80, an I/O device 86, and memories ROM 81, RAM 82, and nonvolatile RAM 83. Among the important functionalities of the PSD 50 are a key management functionality 85 and an encryption/decryption functionality 84. One design approach is to employ dedicated hardware for these two functionalities, as suggested by separate blocks 84, 85. In the usual case, however, these two functionalities are in fact carried out by the processor 80 under appropriate stored-program control responsive to ROM 81, manipulating data stored in RAM 82 and in nonvolatile RAM 83. The non-volatile RAM 83 also contains the information about the accounting registers indicative of the stored postage value of the PSD.

It may be desirable to store the accounting data redundantly, as set forth in PCT pub. no. WO 89-11134, which is incorporated herein by reference. In addition, it may be desirable that the redundant memories be of differing technologies, as set forth in the aforementioned PCT publication. Finally, it is extremely desirable to protect the memory from harm due to processor malfunction, as set forth in U.S. Pat. No. 5,276,844, in EP pub. no. 527010, or in EP pub. no. 737944, each of which is incorporated herein by reference.

Figure 7:
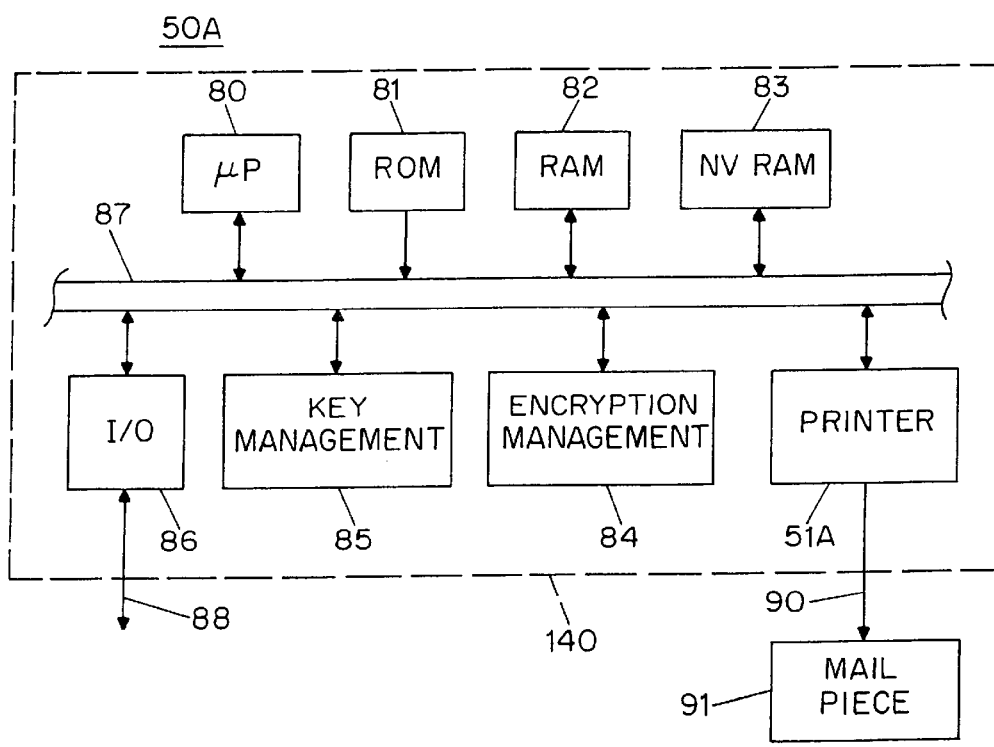
FIG. 7 is a functional block diagram of a typical postage meter of a type used in connection with the invention.

FIG. 7 is a functional block diagram of a typical postage meter 50A of a type used in connection with the invention. Its function is closely analogous to that of the PSD 50 of FIG. 6. A chief difference is that the printer 51A is within the secure housing 140.

Figure 8:
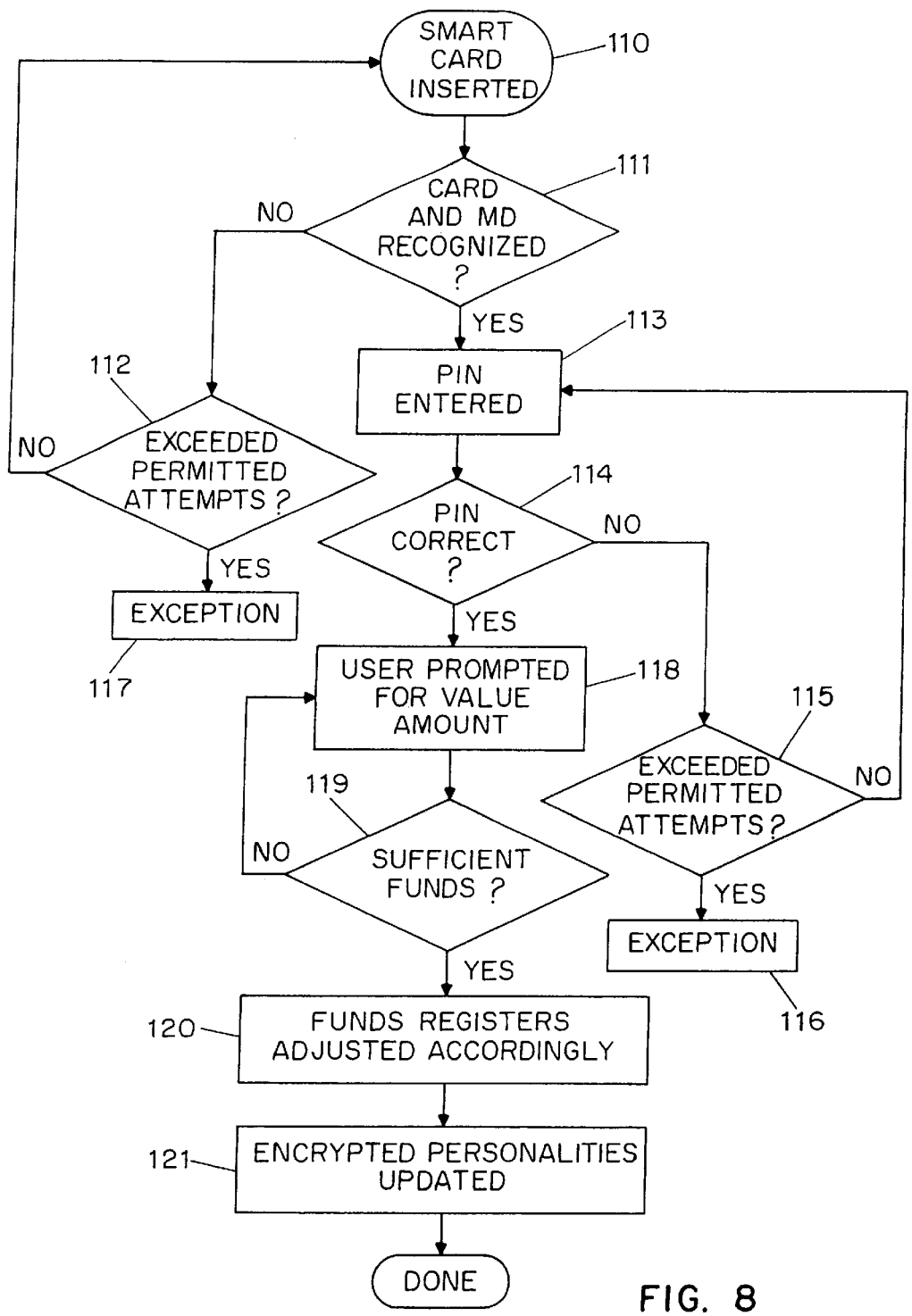
FIG. 8 is a flowchart showing a typical sequence of events in the transfer of stored value from a postage metering device to a stored-value card.

FIG. 8 is a flowchart showing a typical sequence of events in the transfer of stored value from a postage metering device to a stored-value card. The stored-value smart card 54 (refer to FIG. 1) is inserted into the smart-card interface 53 (FIG. 1), at block 110 (FIG. 8). By prearrangement the particular card and PSD are set up to be capable of performing the transfer according to the invention, so a test is made at block 111 to see if the card and PSD or metering device (MD) recognize each other. If the test fails, then at 112 a test is made to see whether a permitted number of attempts has been exceeded. If the permitted number has been exceeded then an exception handler is invoked (block 117) which may result in blocking further function of the MD or further function of the smart card.

Assuming the MD and card do recognize each other, then the user is afforded an opportunity at block 113 to enter a personal identification number (PIN) and a test is made to see if the PIN number is correct. If the test fails, then at 115 a test is made to see whether a permitted number of attempts has been exceeded. If the permitted number has been exceeded then an exception handler is invoked (block 116) which may result in blocking further function of the MD or further function of the smart card.

Assuming the PIN number is correct, then the user is given an opportunity at block 118 to specify the amount of stored value to transfer between the metering device and the stored-value card. A test is made at block 119 to determine whether there are sufficient funds in the metering device. If there are sufficient funds, then the registers in the stored-value card and in the metering device are adjusted to reflect the transfer (block 120). "Personality" information in each device is optionally updated to reflect that each device has participated in the transfer (block 121).

It will be appreciated that what has been set forth is a system which uses the inherent security of postage metering funds stored within a tamper-resistant postage metering memory system, to provide the ability for a customer to retrieve desired funds from the metering system. The funds are added to the stored value in a customer's SMART card such that the SMART card commences to have prepayment value added and the metering system has said value subtracted from its registers.

Funds can be downloaded from the metering registers to a SMART card in a secure manner, thus minimizing the opportunity for fraud. The metering device and the SMART card device have complementary cryptographic algorithms such that only a specifically defined metering device or devices and a specifically defined SMART card device or devices will possess the unique data required to identify the card to the metering system and the metering system to the card. At the time of funds transfer from the metering device to the SMART card device, the metering device and the SMART card device update their complementary encrypted algorithms to relate to the new conditions of the funds just transferred, amount transferred over time (totalizer), date of transfer and the like. Once updated, the resultant encrypted data transferred between the SMART card device and the metering device are unique and one-of-a-kind, dedicated only to those two communicating devices.

The underlying uniqueness is developed by utilizing the personality of the SMART card related to its internal identification number, the metering device serial number (or other metering system identification number), the amount of funds transferred over time (totalizer amount), date of exchange, other internal SMART card identifying parameters, or customer PIN. The PIN is the only customer activity that can potentially be compromised in that if care is not taken, a third party can observe the PIN number that is being entered. Such information is of only limited value to a would-be wrongdoer, however, because it would be necessary not only to possess the PIN number but also the particular card, and it would be necessary to gain access to the metering device.

The chief benefit to the user is that prepaid postage funds are available for use as needed, rather than being dedicated only to postage. In effect the prepaid escrow account residing in the metering device is available to the account's owner.

What is claimed is:

1. A method of transferring funds to a stored-value card, said method mediated by a metering device adapted to enable the printing of postage indicia on mail pieces, said method comprising the steps of:

placing a first amount of funds on deposit with the operator of a telemeter setting host;

performing a telemeter setting session between the host and a metering device, whereby stored value is stored in a postal security device in said metering device in relation to said first amount of funds;

causing said card to be communicatively coupled with said postal security device in said metering device;

confirming existence of a predetermined relation between said card and said metering device;

reducing the stored value in the postal security device in said metering device by a second amount of funds; and increasing the stored value in the card by the second amount of funds.

2. The method of claim 1 wherein the first and second amounts are the same.

3. The method of claim 1 wherein the first amount is greater than the second amount.

4. The method of claim 1 wherein the metering device is a postage meter.

5. The method of claim 1, wherein value is transferred from said postal security device directly to said stored-value card.

6. A system for transferring a first stored-value amount from a host to a metering device and subsequently transferring a second stored-value amount from the metering device to a card carrying encrypted information indicative of stored value, said system comprising;

telemeter setting means associated with the host and the metering device for transferring the first stored-value amount from the host to a postal security device in the metering device in response to a request therefor;

an interface adapted to receive the stored-value card, said interface communicatively coupled with the postal security device in the metering device;

means responsive to a user request for confirming that the metering device and card are in a predetermined relationship;

means for determining whether said postal security device in said metering device has stored within it at least the second stored-value amount; and means for reducing the stored value within the postal security device in the metering device by the second stored-value amount and for increasing the stored value in the card by the second stored-value amount.

7. The system of claim 6 wherein the metering device is a postage meter.

8. The system of claim 6, wherein value is transferred from said postal security device directly to said stored value-card.

9. Apparatus for handling a request for a transfer of a requested amount of stored value from a postal security device in a metering device to a card carrying encrypted information indicative of stored value, said apparatus comprising:

an interface adapted to receive the stored-value card, said interface communicatively coupled with the postal security device in the metering device;

means responsive to a user request for confirming that the metering device and card are in a predetermined relationship;

means for determining whether said postal security device in said metering device has stored within it at least the requested amount; and means for reducing the stored value in the postal security device in the metering device by the requested amount, and for increasing the stored value in the card by the requested amount.

10. The apparatus of claim 9, wherein the metering device is a postage meter.

11. The apparatus of claim 9, wherein value is transferred from said postal security device directly to said stored-value card.

* * * * *